United States Patent
Darscheid et al.

(10) Patent No.: US 9,033,423 B2
(45) Date of Patent: May 19, 2015

(54) CONSTRUCTION MACHINE OR AGRICULTURAL MACHINE HAVING A ROTATING WORK DEVICE AND METHOD FOR DRIVING THE ROTATING WORK DEVICE

(71) Applicant: BOMAG GmbH, Boppard (DE)

(72) Inventors: Thomas Darscheid, Boppard (DE); Marco Reuter, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 36 days.

(21) Appl. No.: 13/714,642

(22) Filed: Dec. 14, 2012

(65) Prior Publication Data
US 2013/0154339 A1    Jun. 20, 2013

(30) Foreign Application Priority Data

Dec. 15, 2011   (DE) .......................... 10 2011 121 288

(51) Int. Cl.
| | |
|---|---|
| E01C 23/088 | (2006.01) |
| A01B 76/00 | (2006.01) |
| A01B 35/00 | (2006.01) |
| E01C 23/12 | (2006.01) |
| A01B 39/08 | (2006.01) |
| A01B 39/20 | (2006.01) |

(52) U.S. Cl.
CPC ................. *A01B 76/00* (2013.01); *A01B 35/00* (2013.01); *E01C 23/12* (2013.01); *A01B 39/085* (2013.01); *A01B 39/20* (2013.01); *E01C 23/088* (2013.01)

(58) Field of Classification Search
CPC ....................................................... A01B 76/00
See application file for complete search history.

(56) References Cited

U.S. PATENT DOCUMENTS

| | | | | |
|---|---|---|---|---|
| 5,354,147 | A * | 10/1994 | Swisher, Jr. .................. | 299/39.6 |
| 5,947,855 | A * | 9/1999 | Weiss ................................ | 475/5 |
| 6,755,482 | B2 * | 6/2004 | Johnson ....................... | 299/39.4 |
| 8,480,181 | B2 * | 7/2013 | Busley et al. ................ | 299/39.4 |
| 2003/0102174 | A1 * | 6/2003 | Bordini ........................ | 180/65.2 |
| 2011/0017533 | A1 * | 1/2011 | Bissontz .................... | 180/65.25 |
| 2011/0021314 | A1 * | 1/2011 | Keeney et al. .................. | 477/35 |
| 2011/0227393 | A1 | 9/2011 | Berning et al. | |
| 2011/0266858 | A1 * | 11/2011 | Laux et al. ..................... | 299/1.5 |
| 2012/0200141 | A1 | 8/2012 | Busley et al. | |

FOREIGN PATENT DOCUMENTS

JP         2010-221946        * 10/2010

OTHER PUBLICATIONS

German Patent Office, Search Report, Application No. 10 2011 121 288.8, mailed Aug. 10, 2012 (5 pages).

* cited by examiner

*Primary Examiner* — John Kreck
(74) *Attorney, Agent, or Firm* — Wood, Herron & Evans, LLP

(57) ABSTRACT

A self-propelled or stationary construction machine or agricultural machine is provided having a rotatable work device, in particular, a work device for processing soil surfaces or for chopping material. The machine has a drive device for the work device, the drive device having a first drive source and a switchable coupling unit between the first drive source and the work device for engaging the work device with the first drive source. The drive device is equipped with an additional drive unit, the machine being configured for controlling the drive device to accelerate the work device by means of the additional drive unit to an operating speed which would result during operation of the work device by means of the first drive source. In addition, an associated method for driving a work device of a construction or agricultural machine is disclosed.

13 Claims, 3 Drawing Sheets

CONSTRUCTION MACHINE OR AGRICULTURAL MACHINE HAVING A ROTATING WORK DEVICE AND METHOD FOR DRIVING THE ROTATING WORK DEVICE

CROSS-REFERENCE TO RELATED APPLICATIONS

The present application claims priority under 35 U.S.C. §119 of German Patent Application No. 10 2011 121 288.8, filed Dec. 15, 2011, the disclosure of which is hereby incorporated herein by reference in its entirety.

FIELD OF THE INVENTION

The present invention relates to a construction machine or agricultural machine which is self-propelled having a rotatable work device, in particular, a work device for processing soil surfaces or for chopping material such as, for example, a milling roller, and a drive device having a first drive source and a switchable coupling device between the first drive source and the work device for engaging the work device with the first drive source. The present invention also relates to a method for driving a rotating work device, in particular, a roller, for processing soil surfaces or for chopping material.

BACKGROUND OF THE INVENTION

Self-propelled or stationary construction machines having rotating work devices or work tools for processing soil surfaces or for chopping material are known from the prior art. A schematic side view of such a construction machine is shown in FIG. 1. The construction machine 10 has a machine frame 60 and a drive source 70 for the drive of transport units 20. Furthermore, the construction machine 10 is equipped with work devices 30, of which only a milling roller for milling the soil surface 40 is shown. The milling roller 30 is driven by a roller drive, which can be decoupled from the milling roller 30. The roller drive is performed by means of the drive source 70, which also drives the transport unit 20, or by means of a separate drive source. The milling roller 30 can be displaced, for example, by using hydraulic cylinders 50, into a raised position, i.e., into an idle position, when the milling roller 30 is not in milling operation. The milling rotor is not engaged with the soil in the idle position.

In operation of the milling roller 30, the force flow is transmitted by means of a switchable clutch, which is optionally implemented with or without a decoupling element, to a belt drive, and fed from the belt drive to the milling roller. For this purpose, a reduction gearing is positioned between the belt drive and the milling roller or between the drive source and the switchable clutch. The switchable clutch can be actuated hydraulically, electrically, pneumatically, mechanically, or in another manner. The switchable clutch can be an elastic clutch, for example.

Engaging the milling roller 30 requires a defined sequence. Firstly, the first drive source must be brought to a reduced speed, typically to the idle speed, before the engagement procedure of the milling roller 30 can be performed. Subsequent to this, the drive source speed of the first drive source can be increased again, so that the desired operating speed of the milling roller 30 is reached. The engagement procedure is designed in such a manner that the entire drive train must be accelerated and synchronized in slip operation of the clutch and the belt drive.

There are comparable concepts in the field of self-propelled agricultural machines with equipment such as field choppers for chopping plant products.

The known concepts for driving a rotating work device of construction machines or agricultural machines have the disadvantage that the switchable clutch and the belt drive are subjected to increased wear, which is largely caused by the required engagement procedure and the slip operation. The clutch can only be shifted at low speeds or speed differences. During the engagement procedure, the drivetrain runs for a certain time in slip operation, which is lengthened still more as a function of the speed difference and the mass inertias of the drivetrain. This results in shortening of the service life of the components.

It is not possible to engage the milling roller drive unit or the work device when the drive source is shut down.

In addition, the switchable clutches used are costly, since they must be specially produced for specific machines in small quantities. Furthermore, it is a disadvantage that such a switchable clutch and a belt drive require a relatively large space.

A self-propelled construction machine having a work device, in particular, a work roller, for carrying out work required during construction measures is known from DE 10 2007 019 202 A1, the construction machine having a drive device having two drive motors for driving the work device. The drive device comprises a first and a second drive motor, which preferably do not differ from one another in construction or power. One motor is used as the main motor, the second motor can be used as an auxiliary motor, the drive power of the first motor and the second motor being transmitted jointly to the work device by means of a force transmission unit. The use of two drive motors of lesser power instead of one motor of greater power results in a more compact construction of the drive unit, whereby an increase of the power of the drive unit is made possible without exceeding the predefined transport width of the self-propelled construction machine.

Furthermore, the force transmission unit therein comprises a first unit for switching the torque of the first drive motor and/or a second unit for switching the torque of the second drive motor. It is thus possible to selectively engage or disengage the main motor and auxiliary motor as a function of the required power. The transmission of the power from the motors to the work device can be performed via a belt drive or a spur gearing.

Furthermore, a construction machine for processing soil surfaces is known from EP 1 294 991 B1, which comprises an internal combustion engine for the drive of a work roller having replaceable tool elements. The construction machine also comprises an auxiliary drive, which is implemented for the purpose of rotating the work roller around a suitably small rotational angle in the raised state. Tools which have not yet been replaced can thus be moved into a more favorable installation position in order to allow replacement of the tool elements with a reduced need for personnel and time and with a reduced risk of accidents.

SUMMARY OF THE INVENTION

The object of the present invention is to provide a construction machine or an agricultural machine of the above-mentioned type, in which cost-effective, space-saving, low-wear, and flexible implementation of the engagement of the rotatable work device with the first drive source is achieved.

To achieve this object, a self-propelled or stationary construction machine or agricultural machine is therefore provided according to one embodiment of the present invention, which comprises a rotatable work device for processing soil surfaces or for chopping material, in particular a roller or a milling roller for processing soil surfaces, and a drive device for driving the work device. The drive device comprises a first drive source and a coupling unit switchable in a slip-free and form-locking manner, for example a positive clutch such as, inter alia, a claw coupling or a gear coupler, which is arranged between the first drive source and the work device for engaging the work device with the first drive source. In addition, the drive device comprises an additional drive unit, the machine being configured for controlling the drive device in such a manner that the work device is accelerated by means of the additional drive unit to an operating speed as would result during operation of the work device by means of the first drive source. According to the invention, a drive connection with the first drive source can be established via the coupling device in a slip-free and form-locking manner as soon as said operating speed is reached.

Furthermore, according to one embodiment of the present invention, a method for driving a rotatable work device attached to a construction or agricultural machine is provided, a first drive source being provided for the drive of the work device. According to the method, the use of an additional drive unit is provided by means of which the work device is engaged with the first drive source in such a manner that before the work device is operated by means of the first drive source, the work device is first accelerated by means of the additional drive unit to an operating speed, which would result during operation of the work equipment by means of the first drive source. As soon as the additional drive unit has accelerated the work device to said operating speed, slip-free and form-locking switching to the first drive source can be achieved, said process occurring in a form-locking and nearly wear-free manner due to the synchronized speeds.

Therefore, according to one embodiment of the present invention, a machine and an associated method are provided in which during an engagement procedure of the respective rotating work device, for example, a milling roller, it is advantageously ensured and made possible that only a small speed difference or, ideally, no speed difference at all must be overcome in the drivetrain. Therefore, less wear occurs during the engagement procedure of the work device than in the machines known from the prior art, which results in a longer service life of the components of the machine according to the present invention. The present invention is particularly advantageously applicable in machines in which the work device is driven by an internal combustion engine. The first drive source is preferably an internal combustion engine.

The present invention advantageously allows for performing a speed synchronization between the first drive source and the milling roller, in particular, prior to the engagement of the milling roller with the first drive source. This speed synchronization is implemented in particular by means of the additional drive unit. The desired operating speed of the milling roller therefore does not have to be set again, since it is already set.

Slip operation and thus also any engagement-related wearing parts are advantageously substantially eliminated in the entire drivetrain, since both a switchable clutch and/or the entire belt drive are dispensed with. If the speed of the first drive source and the speed of the work device are aligned with each other before the engagement of the work device with the first drive source, in the machine according to the present invention, the slip operation, the wear caused thereby, and a shortened service life of the components are completely eliminated.

The engagement procedure is therefore possible at any arbitrary drive source speed of the first drive source. All that is required for this is configuring the additional drive unit such that it is able to adjust the speed of the work device to the respective speed of the first drive source. This can be done electronically or, for example, also mechanically via a suitable device.

An engagement of the milling roller drive unit when the first drive source is shut down is also possible in the machine according to one embodiment of the present invention.

According to one exemplary embodiment, the machine is implemented for selectively moving the work device into an idle position or a working position.

The switchable coupling unit can comprise a switchable disconnecting unit for engaging the work device with the first drive source and a decoupling and/or safety element. The decoupling and/or safety element is preferably arranged between the first drive source and the disconnecting unit and can be an overload clutch, for example.

According to one exemplary embodiment, the drivetrain of the drive unit has a gearing, in particular, a reduction gearing, with the first drive source and the additional drive unit both being able to be coupled to the gearing. The gearing can particularly be a spur gearing. However, the present invention is not restricted to force transmission by means of a spur gearing. In another exemplary embodiment, the machine has a belt drive which is arranged between the first drive source and the work device.

According to an advantageous embodiment of the present invention, the machine is configured in such a manner that the second drive unit is supplied by the first drive source. The second, or additional, drive unit therefore uses drive energy obtained from the first drive source, so that a separate drive source is not required.

In particular, in the machine according to one embodiment of the present invention, small hydraulic motors can be used for supplying the drive unit and mechanical steps can be used for transmitting the force flow to the work device, which results in a further reduction of the costs of the machine according to the present invention, since small hydraulic motors and mechanical switching steps are mass-produced items.

According to another embodiment of the present invention, the additional drive unit of the machine has a second drive source separated from the first drive source, such as a motor, for example, an internal combustion engine and/or an electric motor and/or a hydraulic motor.

In this exemplary embodiment, the additional drive unit preferably also has a motor with weaker power in comparison to the first drive source.

According to one embodiment of the present invention, the second drive source is at the same time used as a starter or starter motor of the first drive source and therefore as the start-stop system of the primary drive source.

More flexible startup possibilities of the work equipment thus result according to the present invention.

By means of the design according to the present invention, the rotor of the work device can advantageously be kept in motion even if at least temporarily being disconnected from the primary drive source. The wear is thus minimized, and time and power are saved, since the milling roller does not first have to be accelerated from an idle state to the desired operating speed during the next work procedure, which is connected with a high power loss, in particular, because of the high mass of the milling roller. In comparison to the prior art, causing damage using the rotating rotor of the work device in a hazardous manner can therefore be avoided, in particular, which could arise if the speed of the work device was fixed by the drive source speed of the primary drive source and could not be set to a lower, more harmless speed.

The machine according to one embodiment of the present invention is advantageously implemented for shutting down the power supply of the additional drive unit and/or decoupling the additional drive unit from the work device or the drivetrain. Therefore, in particular, the second drive source can optionally be decoupled or shut down, respectively, after the rotor of the work device has been started, to minimize wear and power. This is performed similarly to a starter motor of an automobile.

According to an advantageous embodiment of the present invention, a synchronization unit is arranged in the drivetrain for the work device for adapting the speed of the first drive source with respect to the speed of the second drive source or the work device, respectively.

The disconnecting unit, which is switchable, in particular, in a slip-free and form-locking manner, is preferably equipped with the synchronization unit for adjusting small speed differences between the first drive source and the work device. In particular, cost-effective synchronization rings which are installed in the gearing switching step can be used as the synchronization unit.

If such a synchronization unit is present in the drivetrain of the machine according to an exemplary embodiment of the present invention, a simpler second drive source will generally be sufficient for supplying the additional drive unit, because the operating speed to which the work device has to be accelerated does not have to be established precisely. In the simplest case, an unregulated drive source is sufficient as the second drive source, which has a predetermined speed (target value). For example, a hydraulic fixed-speed pump and a hydraulic fixed-speed motor can then be used as the second drive source.

In the method according to one embodiment of the present invention, the work device is preferably moved into an idle position prior to the engagement with the first drive source, which, in particular occurs in a slip-free and form-locking manner.

According to an exemplary embodiment of the present invention, the work device is engaged with the shut-down first drive source before it is accelerated to the operating speed by means of the second drive source.

According to an alternative exemplary embodiment, or, depending on the embodiment, according to a further development of the present invention, the work device is engaged with the first drive source operated at an idle speed.

According to the present invention, the second drive source can be shut down after the work device has been accelerated to the operating speed by means of the drive unit.

According to a further preferred embodiment of the present invention, the machine according to the present invention is a self-propelled machine, whose first drive source is implemented for also driving the transport units of the self-propelled machine.

The concept according to the present invention can be used, in particular, in cold milling machines, stabilizers, recyclers, or also in agricultural machines such as, for example, field choppers.

BRIEF DESCRIPTION OF THE DRAWINGS

The present invention is explained in greater detail hereafter. In the schematic figures.

DETAILED DESCRIPTION OF THE INVENTION

Figure 1:
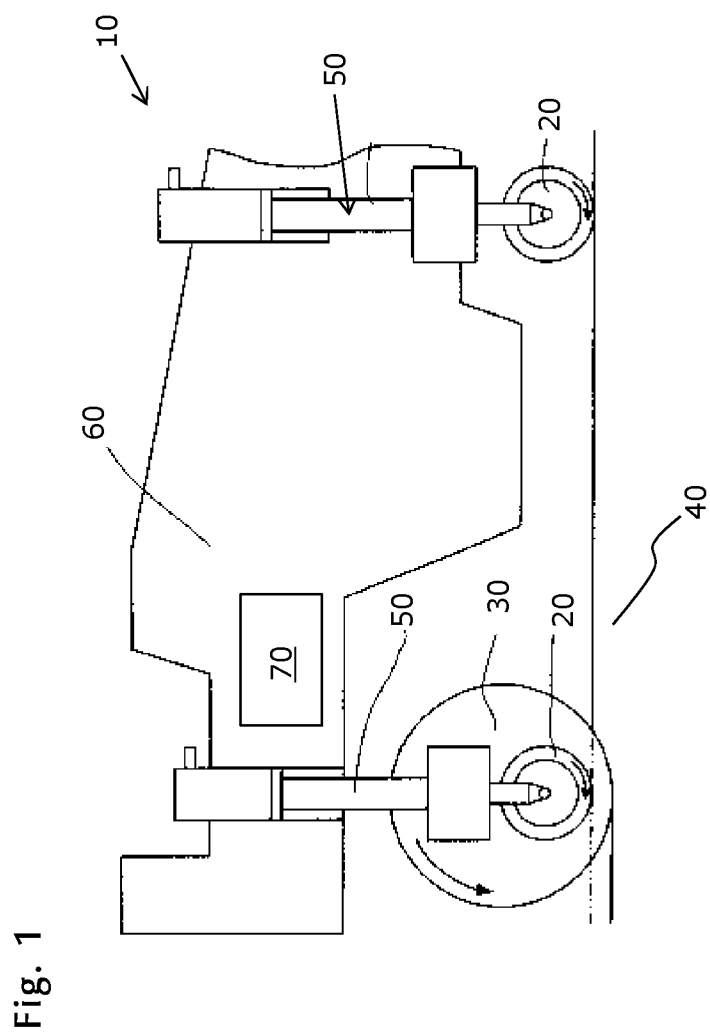
FIG. 1 shows a side view of an exemplary construction machine as known from the prior art, having a milling roller for processing soil surfaces.
Figure 2:
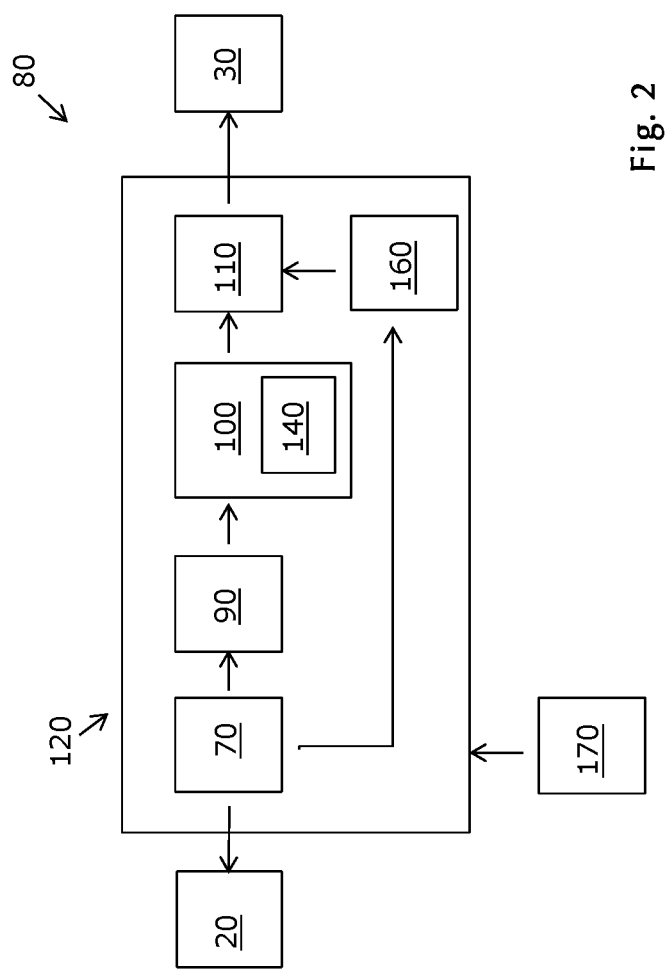
FIG. 2 shows a block diagram of the drivetrain of the construction machine or agricultural machine according to an exemplary embodiment of the present invention.

FIG. 2 shows a block diagram of the drivetrain 80 of a construction and agricultural machine 10 according to an exemplary embodiment of the present invention. The drivetrain 80 of the machine is constructed in such a manner that the force flow is supplied in a drive device from the first drive source 70, in particular, via a switchable disconnecting unit 100, to a gearing 110. A decoupling and/or safety element 90, which can, for example, be an overload clutch, is arranged between the switchable disconnecting unit 100 and the drive source 70. The gearing 110 is coupled to the work device 30, which in the present exemplary embodiment is a milling roller, and transmits the desired power to the work device 30. In the exemplary embodiment, not only the work device 30 but rather also the transport units 20 are driven with the aid of the first drive source 70. The disconnecting unit 110 has a synchronization unit 140 to compensate for small speed differences. Furthermore, a controller 170 for the drive device 120 is provided by means of which the synchronization of the speeds of the first drive source 70 and the work device 30 can be implemented supplementary or alternatively to the synchronization unit described in further detail hereinafter.

Figure 3:
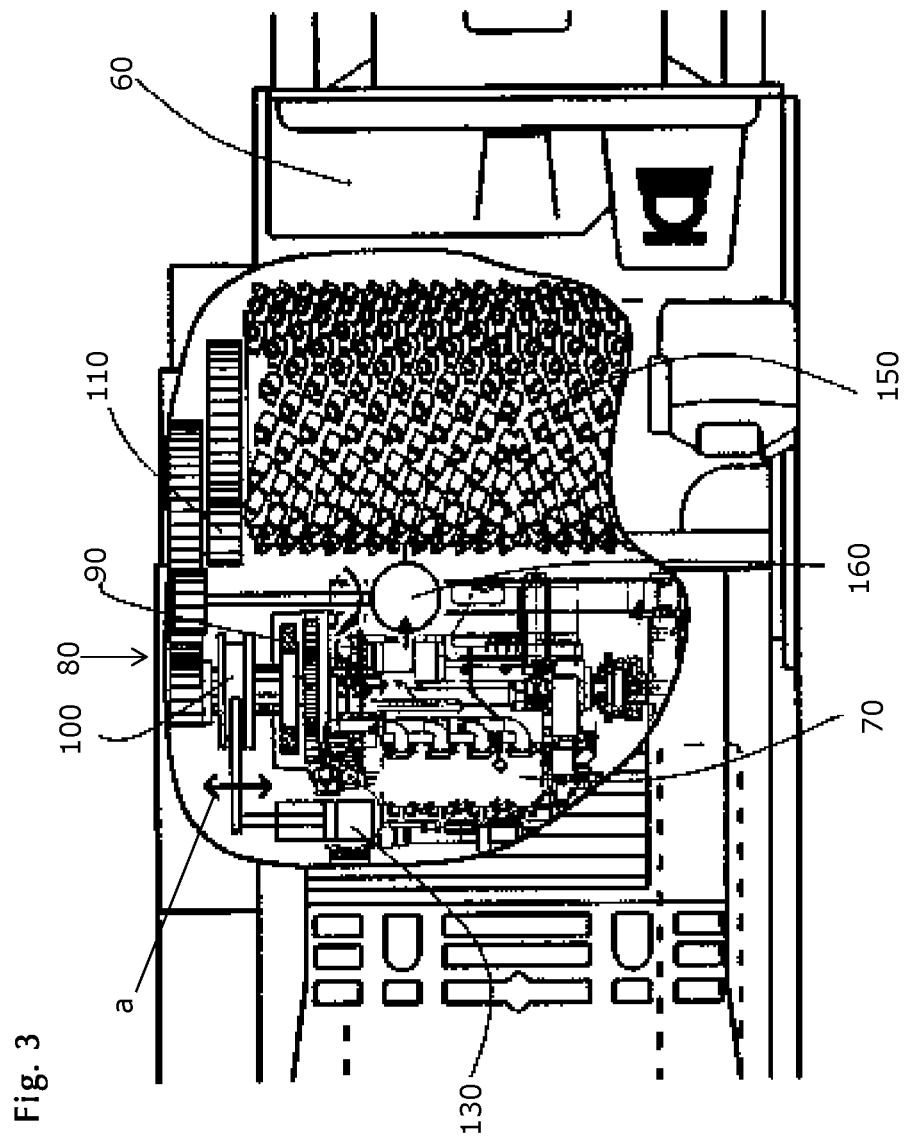
FIG. 3 shows a top view of a construction machine having a milling roller for processing soil surfaces according to an exemplary embodiment of the present invention.

FIG. 3 shows a schematic top view of a construction machine 10 having a milling roller 150 as the work device for processing soil surfaces according to another embodiment of the present invention.

The construction machine 10 according to one embodiment of the present invention comprises a machine frame 60, a first drive source 70, and a force transmission unit or a drivetrain 80 for transmitting the force flow from the first drive source 70 to the milling rotor 150 (referred to as item 30 in FIG. 2). The drivetrain 80 is constructed in such a manner that the force flow is supplied from the first drive source 70, optionally via a decoupling element and/or safety element 90 or without the same, if needed also to a pump distributor gearing for supplying secondary functions of the construction machine 10, via a switchable disconnecting unit 100 to a gearing 110.

In the present exemplary embodiment, the switchable disconnecting unit 100 is a force transmission sleeve which is axially displaceable against the drive shaft by means of a hydraulic cylinder. Said force transmission sleeve is arranged in such a manner that by way of displacement it is able to establish a slip-free and form-locking connection to the gearing 110, for example, by tooth engagement, and, upon displacement in the direction towards the motor following arrow a, to release the connection. The force transmission connection of the first drive source 70 to the gearing 110 thus occurs via the disconnecting unit 100 exclusively in a slip-free and form-locking manner, as a result of which slip-related wear is nearly completely eliminated in this area.

The safety element 90 is used, in particular, to protect the construction machine 10 according to the present invention from overload. An elastic element can also be included in the drivetrain 80 for vibration damping.

The gearing 110 can be, for example, a spur gearing, a bevel wheel gearing, or a gearing implemented in another manner, particularly having gearing elements arranged in a form-locking manner, such as, for example, gearing wheels, for force transmission. The gearing 110 is coupled to the milling roller 150 and transmits the drive power thereto.

The speed synchronization of the first drive source 70 and the milling roller 150 is performed by means of an additional drive unit 160, in particular, arranged downstream from the switchable disconnecting unit 100 in the force flow, which can optionally be integrated in the gearing 110, adapted thereto, or can be provided on the milling roller 150. The additional drive unit 160 can optionally have a hydraulic, electrical, pneumatic, mechanical, or other type of drive source. The power supply of the additional drive unit 160 can optionally be performed by using a small power component of the primary drive source 70 or by the use of a second motor, for example, a second internal combustion engine, an electric motor, or a hydraulic motor. In the present exemplary embodiment, the drive energy is supplied to the additional drive unit 160 via the primary drive source 70. In the present case, the additional drive unit 160 is also a hydraulic pump, or, more specifically, a hydraulic pump which is arranged on a pump distributor gearing which is supplied with drive energy by the internal combustion engine. The hydraulic pump can be coupled to the gearing 110.

The switchable disconnecting unit 100 is optionally equipped with a synchronization unit (not shown), which is implemented for adaptation of small speed differences between the first drive source 70 and the work equipment 30.

Furthermore, the switchable disconnecting unit 100 can be actuated hydraulically, electrically, or mechanically, in particular, by means of a hydraulic cylinder 130, and therefore allows the transmission of the force flow from the first drive source 70 via the gearing 110 to the work device 30. More specifically, the switchable disconnecting unit 100 can effect, for example, an axial and/or linear displacement of a torque transmission element between the first drive source 70 and the gearing 110.

Particularly, compared to a friction clutch, the switchable disconnecting unit 100, which can be coupled to the gearing 110 in a slip-free and form-locking manner, is characterized by a service life which corresponds to the service life of the mobile work machine 10 and is comparable, for example, to the service life of the clutches in a powershift transmission of a utility vehicle.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A construction machine or agricultural machine comprising:
    a rotatable work device for processing soil surfaces and/or for chopping material; and
    a drive device for the work device, the drive device having a first drive source, a switchable coupling unit between the first drive source and the work device for engaging the work device with the first drive source, and a gearing coupled to the work device,
    wherein the drive device has an additional drive unit and the machine is configured for controlling the drive device to accelerate the work device by the additional drive unit to an operating speed which would result during operation of the work device by the first drive source,
    wherein the switchable coupling unit can be switched in a slip-free and form-locking manner,
    wherein the additional drive unit is supplied by the first drive source,
    wherein a force flow is supplied in the drive device from the first drive source via the switchable coupling unit to the gearing, and
    wherein the first drive source and the additional drive unit are both able to be coupled to the gearing.

2. The machine according to claim 1, wherein the coupling unit, which is switchable in a slip-free and form-locking manner, comprises a switchable disconnecting unit for engaging the work device with the first drive source and a decoupling and/or safety element, which is arranged between the first drive source and the disconnecting unit.

3. The machine according to claim 1, wherein the additional drive unit has a second drive source.

4. The machine according to claim 1, wherein a synchronization unit is arranged for adapting the speed of the first drive source with respect to the speed of the additional drive unit or the work device, respectively.

5. The machine according to claim 1, further comprising transport units driven by the first drive source.

6. The machine according to claim 1, wherein the gearing comprises a reduction gearing.

7. The machine according to claim 3, wherein the second drive source comprises an electric motor.

8. A method for driving a rotatable work device attached to a construction or agricultural machine by a drive device, the drive device having a first drive source, a switchable coupling unit between the first drive source and the work device for engaging the work device with the first drive source, and a gearing coupled to the work device, comprising:
    engaging the work device with the first drive source in a slip-free and form-locking manner such that, before the work device is operated by the first drive source, the work device is accelerated by an additional drive unit to a predetermined operating speed which would result during operation of the work device by engagement with the first drive source,
    wherein the additional drive unit is supplied by the first drive source,
    wherein a force flow is supplied in the drive device from the first drive source via the switchable coupling unit to the gearing, and
    wherein the first drive source and the additional drive unit are both able to be coupled to the gearing.

9. The method according to claim 8, wherein the work device is moved into an idle position before it is engaged with the first drive source.

10. The method according to claim 8, wherein the work device is engaged with a shut-down first drive source before the work device is accelerated to the operating speed by the additional drive unit.

11. The method according to claim 8, wherein the work device is engaged with the first drive source, which is operated at an idle speed.

12. The method according to claim 8, wherein after the work device has been accelerated to the operating speed by the additional drive unit, the additional drive unit is shut down.

13. The method according to claim 8, wherein during the engagement of the work device with the first drive source, with the work device accelerated by the additional drive unit to the predetermined operating speed, a speed synchronization is carried out between the first drive source and a remaining drivetrain of the work device.

\* \* \* \* \*